United States Patent [19]

Shimanuki et al.

[11] Patent Number: 4,773,714
[45] Date of Patent: Sep. 27, 1988

[54] ANTI-SKID CONTROL SYSTEM FOR MOTOR VEHICLES

[75] Inventors: Haruki Shimanuki, Kasukabe; Katsuya Miyake, Ageo; Hideo Akima, Yokohama; Akira Hoashi, Munakata, all of Japan

[73] Assignees: Akebono Brake Industry Co., Ltd., Tokyo; Fujitsu Limited, Kanagawa, both of Japan

[21] Appl. No.: 947,189

[22] Filed: Dec. 29, 1986

[30] Foreign Application Priority Data

Dec. 27, 1985 [JP] Japan ............................ 60-292995

[51] Int. Cl.$^4$ ............................................... B60T 8/10
[52] U.S. Cl. .................................... 303/108; 303/109; 188/181 C
[58] Field of Search ............... 303/108, 109, 111, 94, 303/107, 102, 95; 188/181.1 C; 364/426

[56] References Cited

U.S. PATENT DOCUMENTS

| | | | |
|---|---|---|---|
| 3,690,735 | 9/1972 | Arai et al. | 188/181.1 C X |
| 3,705,748 | 12/1972 | Ochiai | 303/109 |
| 3,768,873 | 10/1973 | Hirzel | 303/109 |
| 4,693,522 | 9/1987 | Wupper et al. | 303/108 X |

FOREIGN PATENT DOCUMENTS

| | | | |
|---|---|---|---|
| 2901740 | 7/1979 | Fed. Rep. of Germany | 303/108 |
| 1123496 | 5/1982 | Canada | 303/109 |

Primary Examiner—Andres Kashnikow
Assistant Examiner—Matthew C. Graham

[57] ABSTRACT

An anti-skid control system for motor vehicles is provided wherein a computed wheel speed Vv is set up on the basis of the highest one of the wheel speeds of the motor vehicle; a first reference speed VT1 and a second reference speed VT2 are set up which are lower than and follow the computed vehicle speed Vv either with a first and second predetermined speed difference respectively or with a first and a second predetermined ratio respectively, the first reference speed VT1 being higher than the second reference speed VT2 (VT1>VT2); in the case where the wheel speed continues decreasing with a deceleration lower than a predetermined threshold level of deceleration, reduction of brake pressure is started at a point of time when a predetermined time period T1 elapsed from a point of time when the wheel speed reached the level of the second reference speed VT2; and the reduction of the brake pressure is stopped at a point of time when the wheel speed was increased up to the level of the first reference speed VT1 as a result of the reduction of the brake pressure.

3 Claims, 4 Drawing Sheets

ANTI-SKID CONTROL SYSTEM FOR MOTOR VEHICLES

BACKGROUND OF THE INVENTION

1. Field of the Invention

This invention relates to a novel and improved anti-skid control system for motor vehicles, which is operative to prevent the wheels of the motor vehicle from skidding during braking operation of the motor vehicle.

2. Description of the Prior Art

Generally, with an anti-skid control system for motor vehicles, control is effected by means of microcomputers such that hold valves and decay valves comprising electromagnetic valves are opened and closed on the basis of electrical signals representing wheel speeds sensed by wheel speed sensors, thereby increasing, holding or reducing the brake pressure, for the purposes of securing improved steering performance and running stability of the motor vehicle, while at the same time shortening the braking distance.

FIG. 1 of the accompanying drawings illustrates, by way of example, manners in which wheel speed Vw, wheel acceleration and deceleration $+V_w$, $-V_w$ Pw are varied during the operation of the conventional anti-skid control system, together with hold signal HS and decay signal DS for opening and closing hold valves and decay vlaves.

When the brake apparatus of a running motor vehicle is not operated, the hold valves remain open while the decay valves remain closed, add the brake pressure Pw is not increased; and when the brake apparatus is operated, the brake pressure Pw is increased at timc t1 so that the wheel speed is decreased. A reference wheel speed Vt is set up which is lower by a predetermined amount $\Delta V$ than the wheel speed Vw and follows the latter with such a speed difference. More specifically, the reference wheel speed Vt is set up so that when the deceleration (negative acceleration) $-V_w$ of the wheel reaches a predetermined threshold level, say $-1G$ at time t2, the reference wheel speed Vt is thereafter made to linearly decrease with a decerelation gradient of $-1G$. At time t3 when the deceleration $-V_w$ of the wheel reaches a predetermined maximum value $-G_{max}$, the hold signal HS is interrupted so that the hold valves are closed, thus holding the brake pressure Pw.

Because of the brake pressure Pw being held, the wheel speed Vw is further decreased. At time t4, the wheel speed Vw and the reference wheel speed Vt become equal to each other, and decay signal DS is generated, by which the decay valves are opened so that reduction of the brake pressure Pw is started. As a result of this reduction of the brake pressure Pw, the wheel speed Vw is changed from deceleration to acceleration, at time t.5 when a low peak V1 of the wheel speed Vw occurs. Either at the time t5 or at time t6 when the wheel speed Vw is increased up to the level of a speed Vb that is higher than the low peak by 15% of the difference A between the wheel speed Va at the time t4 when the reduction of the brake pressure is started, and the low-peak speed V1, the decay signal DS is interrupted, and as a result the decay valves are closed so that the reduction of the brake pressure Pw is stopped and thus the brake pressure is held. The wheel speed Vw is further increased and reaches a high peak at time t7; thereupon, the brake pressure Pw is again increased. In this case, the buildup of the brake pressure Pw is effected in such a manner that the brake pressure Pw is alternately increased and held in succession by the fact that the hold signal HS is turned on and off mincingly so that the brake pressure Pw is caused to gradually build up. In this way, the wheel speed Vw is decreased, and at time t8, the mode for reduction of the brake pressure occurs again. The brake pressure increasing, holding and reducing modes are effected in combination as mentioned above, and thus the wheel speed Vw can be controlled so that the vehicle speed can be decreased, while the wheels of the motor vehicle are prevented from being locked.

In the above conventional anti-skid control system, to avoid any adverse influence of unwanted information noise which tends to be generated depending on the road surface condition, the threshold level of deceleration at which the reference wheel speed Vt is changed so as to linearly decrease with a constant gradient, is selected to be say $-1G$, which is higher than deceleration which tends to occur in a normal situation. That the deceleration of the wheel speed has reached the aforementioned threshold level $-1G$, is detected; on the basis of the detection, the reference wheel speed Vt is made to decrease with the deceleration gradient of $-1G$ from the time t2 onward; and at the time t4 when the wheel speed Vw and the reference wheel speed Vt become equal to each other, reduction of the brake pressure Pw is initiated. Thus, in the case where the wheel speed Vw is decreased with a deceleration, say $-0.7G$, lower than the aforementioned threshold level of deceleration $-1G$ as a result of light braking, for example, the reference wheel speed Vt simply follows the wheel speed Vw with the speed difference $\Delta V$ and never becomes equal thereto; hence, no point of time when the brake pressure Pw is to be reduced, is detected so that the wheel speed continues decreasing with an increasing deviation from the vehcile speed. Thus, on a road surface with a low coefficient of friction, early-locking of the wheel is liable to be caused.

SUMMARY OF THE INVENTION

Accordingly, it is an object of the present invention to provide a novel and improved anti-skid control system for motor vehicles, which is so designed that even with such light braking that a point at which brake pressure is to be reduced does not occur during normal anti-skid control operation, such a brake pressure reducing point is made to occur, and the wheel speed as greatly dropped is permitted to sufficiently recover so that early-locking of the wheel can be avoided.

Briefly stated, according to the present invention, a computed wheel speed Vv is set up on the basis of the highest one of the wheel speeds of the motor vehicle; a first reference speed VT1 and a second reference speed VT2 are set up which are lower than and follow the computed vehicle speed Vv either with a first and second predetermined speed difference respectively or with a first and a second predetermined ratio respectively, the first reference speed VT1 being higher than the second reference speed VT2 (VT1>VT2); in the case where the wheel speed continues decreasing with a deceleration lower than a predetermined threshold level of deceleration, reduction of brake pressure is started at a point of time when a predetermined time period T1 elapses from a point of time when the wheel speed reaches the level of the second reference speed VT2; and the reduction of the brake pressure is terminated at a point of time when the wheel speed is increased up to the level of the first reference speed VT1 as a result of the reduction of the brake pressure.

Other objects, features and advantages of the present invention will become apparent from the ensuing description taken in conjunction with the accompanying drawings.

DESCRIPTION OF THE PREFERRED EMBODIMENTS

Figure 2:
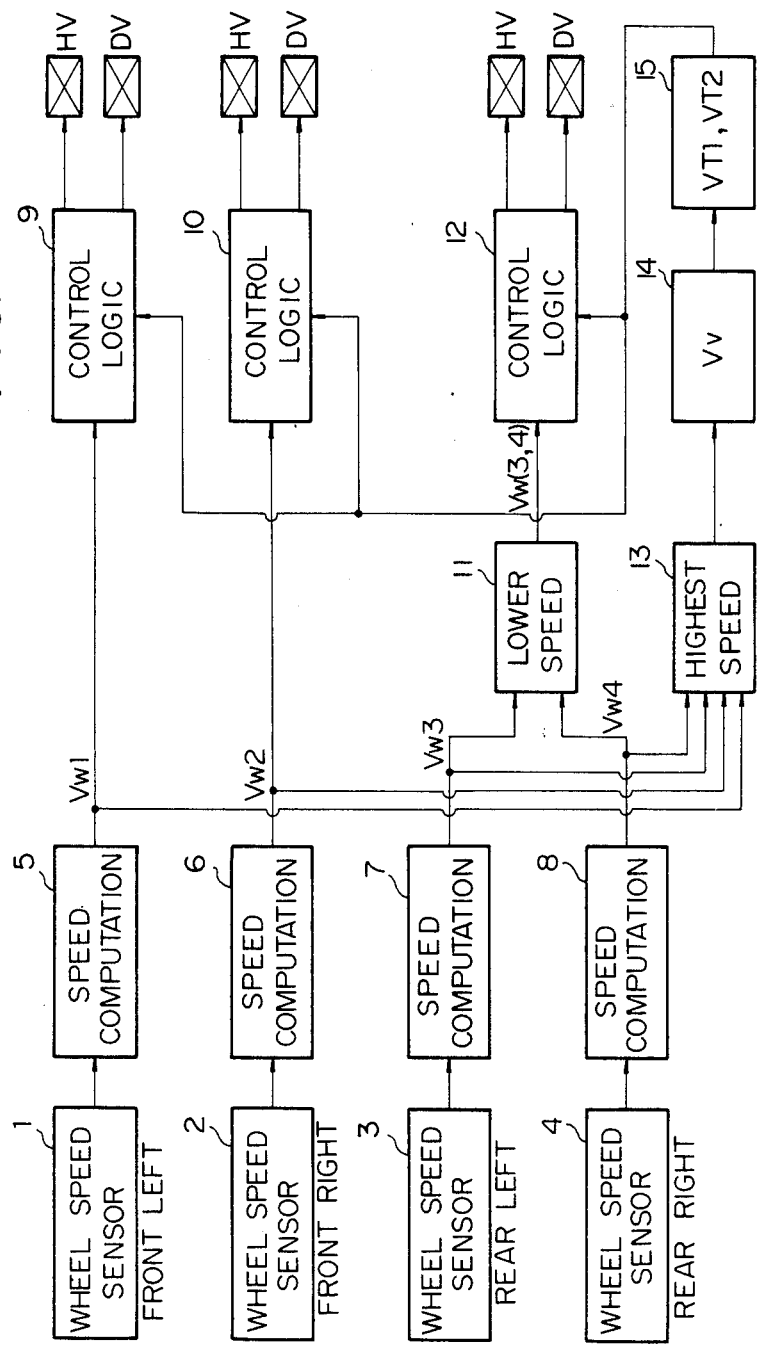
FIG. 2 is a block diagram showing the anti-skid control system according to an embodiment of the present invention.
Figure 3:
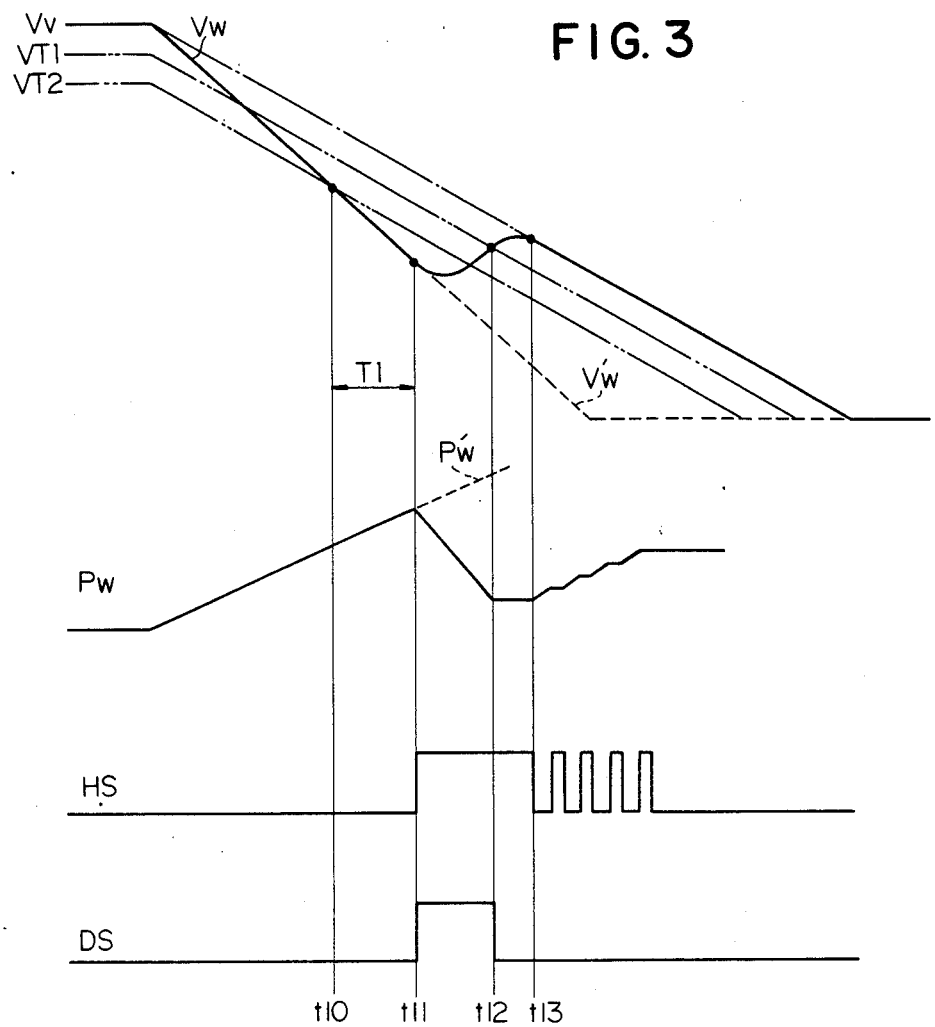
FIG. 3 is a view useful for explaining the operation of the present system.
Figure 4:
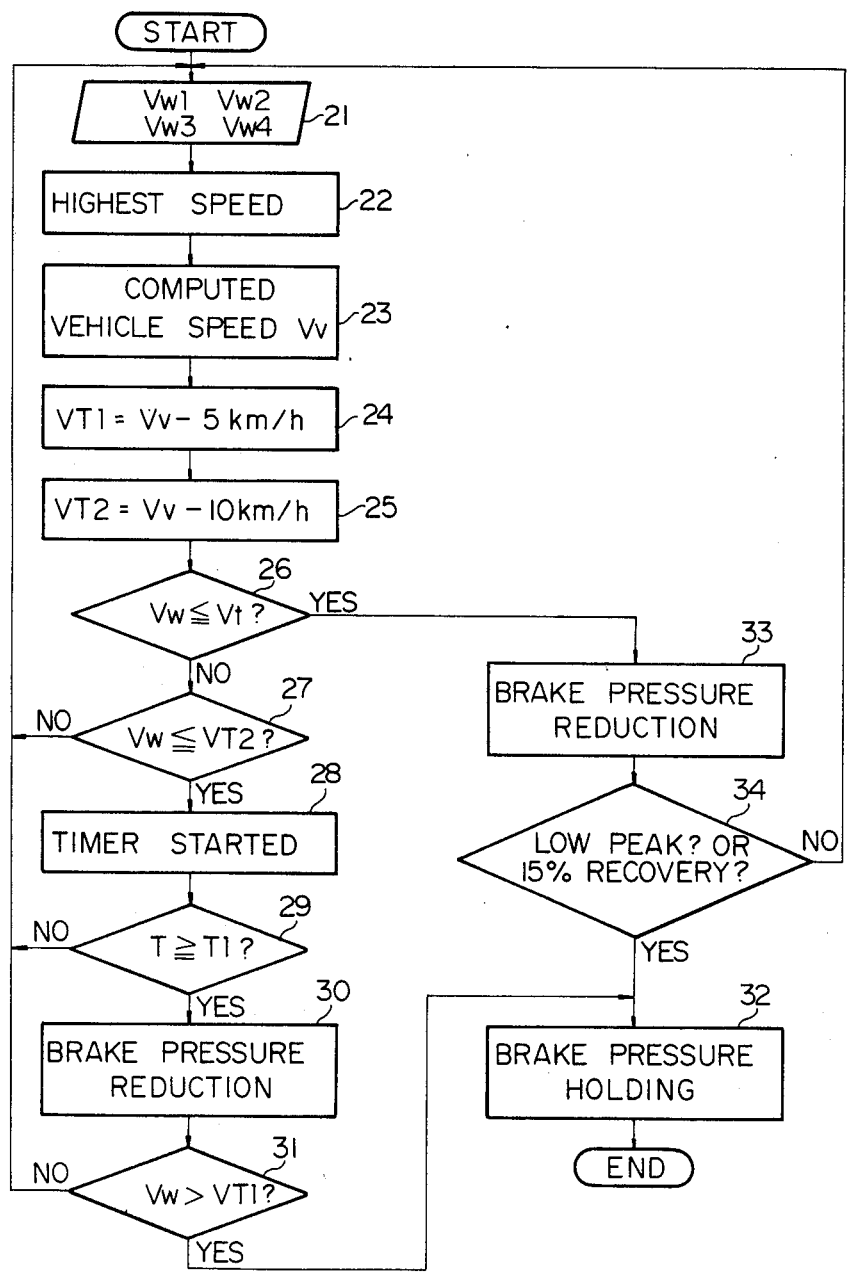
FIG. 4 is a flow chart useful for explaining the operation of the present system.

Referring to FIG. 2, there is shown, in a block diagram, the anti-skid control system according to an embodiment of the present invention, and referring to FIG. 3, there are shown the relationships between wheel speed $V_w$, brake pressure $P_w$, hold signal HS, and decay signal DS.

The anti-skid control system shown in FIG. 2 includes a front left wheel speed sensor 1, a front right wheel speed sensor 2, a rear left wheel speed sensor 3, and a rear right wheel speed sensor 4. Wheel speeds $V_{w1}$ to $V_{w4}$ are computed in speed computation circuits 5 to 8 on the basis of signals derived from the wheel speed sensors 1 to 4, respectively; the front left and right wheel speeds $V_{w1}$ and $V_{w2}$ are inputted to control logic circuits 9 and 10 respectively; the rear left and right wheel speeds $V_{w3}$ and $V_{w4}$ are inputted to a selector circuit 11 so that the lower one of these two wheel speeds is selected, and the selected lower wheel speed, which will be represented by $V_w(3,4)$, is inputted to a control logic circuit 12; and hold valves HV and decay valves DV are controlled by the control logic circuits 9, 10, and 12.

Figure 1:
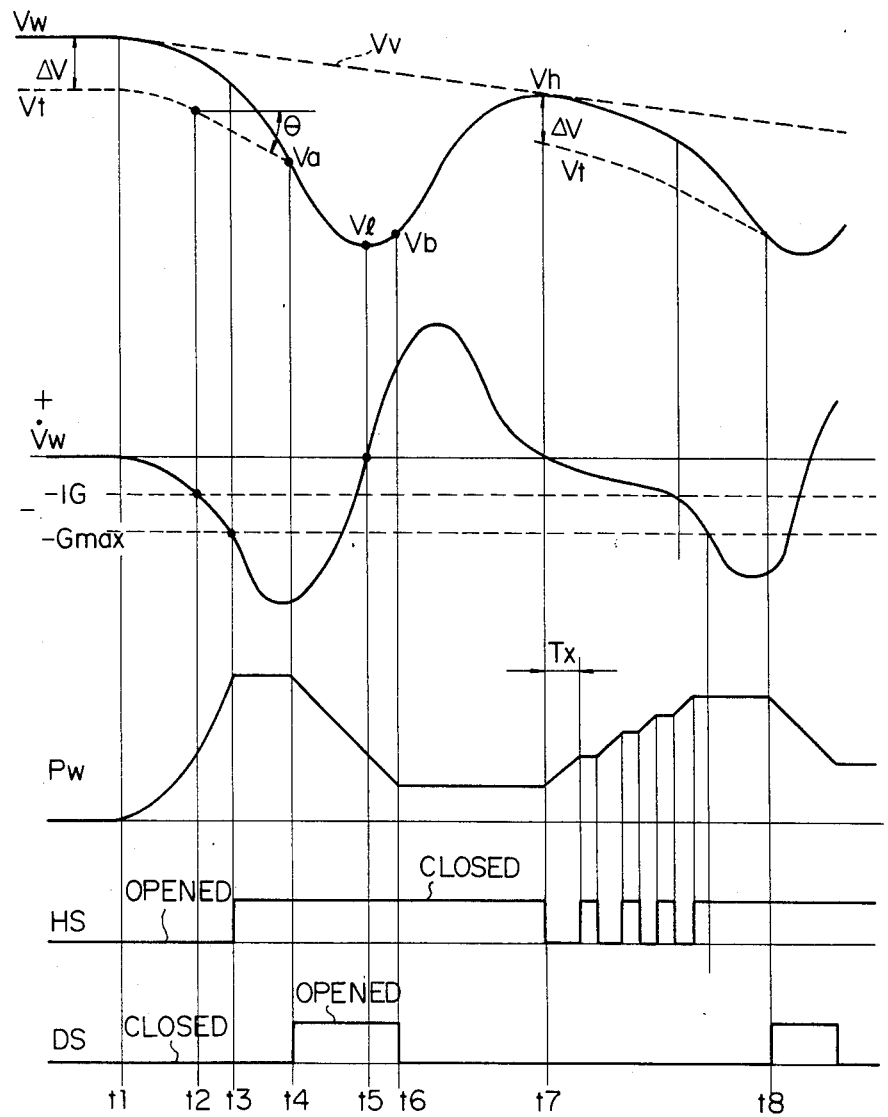
FIG. 1 is a view useful for explaining the operation of the conventional anti-skid control system.

Furthermore, the wheel speeds $V_{w1}$ to $V_{w4}$ are inputted to another selector circuit 13 so that the highest one of those wheel speeds is selected; and the selected highest wheel speed is passed through a limiter 14 which is so designed as to limit variations in the selected highest wheel speed to be in the range of $-1G$ to $+1G$, so that such a computed vehicle speed as shown as t Vv in FIG. 3 is set up which may vary with a deceleration gradient of 0.2G, for example. Subsequently, the computed vehicle speed $V_v$ is inputted to a reference speed setting-up circuit 15 in which on the basis of the computed veticle speed $V_v$, reference speeds VT1 and VT2 are set up wtich are lower by 5 km/h and 10 km/h than and follow the computed vehicle speed $V_v$ respectively. The output of the reference speed setting-up circuit 15 is provided to the control logic circuits 9, 10, 12. In the respective control logic circuits 9, 10, and 12, as in the prior art, the wheel speed $V_w$, which may be $V_{w1}$, $V_{w2}$, or $V_w(3,4)$, is compared with the reference wheel speed $V_t$ all the time. Thus, at the time 4 (FIG. 1), for example, when the wheel speed $V_w$ and reference wheel speed $V_t$ become equal to each other, reduction of the brake pressure is initiated; and either at the time t5 when a low peak of the wheel speed $V_w$ occurs or at the time t6 when 15% recovery of the wheel speed from the low peak occurs, the reduction of the brake pressure is stopped. However, in the case where the deceleration $-V_w$ of the wheel is as low as $-0.7G$, for example and does reach the predetermined threshold level $-1G$ even though the brake pressure $P_w$ was increased, then no point where the brake pressure is to be reduced, will occur, and the wheel speed will reach the level of the reference speed VT2 at time t10 as shown in FIG. 3. In such a case, since the deceleration of the wheel $-V_w$ does not reach the threshold level $-1G$ as mentioned above, no hold signal HS is generated so that the wheel speed continues decreasing. At the time t10 when the wheel speed $V_w$ reaches the level of the reference speed VT2, a timer is started to count time; and at time t11 when a predetermined time period T1 (150 ms, for example) elapses, both the hold signal HS and decay signal DS are generated so that the hold valves HV are closed while the decay valves DV are opened, and consequently reduction of the brake pressure $P_w$ is initiated. As a result of this brake pressure reduction, the wheel speed $V_w$ is changed from deceleration to acceleration; in this case, however, the reduction of the brake pressure $P_w$ is not interrupted when low peak of the wheel speed $V_w$ occurs or when 15% recovery of the wheel speed $V_w$ from the low peak occurs. At time t12 when the wheel speed $V_w$ is increased up to the level of the reference speed VT1, the decay signal DS is interrupted so that the decay valves DV are closed. Thus the brake pressure reduction is stopped, and the brake pressure is held. Thereafter, at time t13 when high peak of the wheel speed $V_w$ occurs, the brake pressure is increased.

If the reduction of the brake pressure $P_w$ is not started at the time t11, then the brake pressure will build up as shown at $P_w'$ in FIG. 3, so that wheel speed will be decreased as shown at $V_w'$, and early-locking of the wheel will be caused.

Referring to FIG. 3, there is shown a flow chart which illustrates the manner in which the decay valves are controlled in accordance with the present invention. At step 21, the respective wheel speeds $V_{w1}$ to $V_{w4}$ are first read in; at step 22, the highest one of the wheel speeds $V_{w1}$ to $V_{w4}$ is selected; and at step 23, the selected highest wheel speed is passed through a limiter which is so designed as to limit variations in the selected highest wheel speed to be in the range from $-1G$ to $+1G$, so that a computed vehicle speed $V_v$ is established. At step 24, a reference speed VT1 ($=V_v-5$ km/h) is set up on the basis of the computed vehicle speed; and then at step 25, another reference speed VT2 ($=V_v-10$ km/h) is set up on the basis of the computed vehicle speed $V_v$. Subsequently, at step 26, judgment is made as to whether the wheel speed $V_w$ became equal to a reference wheel speed $V_t$; and if the result of the judgment is "NO", then at step 27, judgment is made as to whether the wheel speed $V_w$ reached the level of the reference speed VT2. If the result of the judgment at step 27 is "YES", then at step 28, a timer is started at time t10 when the wheel speed $V_w$ reached the level of the reference speed VT2. At step 29, judgment is made as to whether a predetermined time period elapsed from the time t10; and if the result of the judgment is "YES", then at step 30, a decay signal DS is generated so that reduction of the brake pressure is started at time t11. At step 31, judgment is made as to whether the wheel speed $V_w$ was increased up to the level of the reference speed VT1; and if the the result of the judgment is "YES", then at step 32, the decay signal is interrupted so that the brake pressure reduction is stopped and the brake pressure Pw is held at time t12.

If the result of the judgment at step 26 is "YES", i.e., if the wheel speed Vw became equal to the reference wheel speed Vt, then reduction of the brake pressure will be started at step 33 as in the prior art described above in connection with FIG. 1. At step 34, the brake pressure reduction is stopped and the brake pressure is held either at time when low peak of the wheel speed Vw occurs or at time when 15% recovery of the wheel speed from the low peak occurs.

Although in the foregoing embodiment, the reference speeds VT1 and VT2 were related to the computed vehicle speed Vv with the predetermined speed differences of 5 km/h and 10 km/h respectively, it goes without saying that it is also possible that such reference speeds may be related to the computed vehicl speed with predetermined ratios.

As will be appreciated from the above discussion, according to the present invention, early-locking of the wheel on a road surface with a low coefficient of friction (low μ), which tends to be caused when the wheel speed Vw is decreased in such a manner that the deceleation thereof does not reach the threshold level of deceleration set up for reduction of brake pressure Pw, can be most effectively avoided by the design that the first and second reference speeds VT1 and VT2 are set up and the point of time when reduction of the brake pressure Pw is to be started and the point of time when the brake pressure reduction is to be stopped, are determined through comparison of the wheel speed and the reference speeds VT1 and VT2.

While the invention has been described and illustrated with respect to specifc embodiments thereof, it is to be understood that the invention is by no means limited thereto but encompasses all changes and modifications which will become possible within the scope of the appended claims.

We claim:

1. An anti-skid control system for a motor vehicle comprising:

first means for setting up a computed vehicle speed on the basis of the highest one of the wheel speeds of the motor vehicle;

second means for setting up a first reference speed and a second reference speed which are lower than and follow said computed vehicle speed, said first reference speed being higher than said second reference speed;

third means for comparing the wheel speed with a predetermined first threshold level; and fourth and fifth means for setting up a point of time when reduction of brake pressure is to be started;

said fourth means being adapted to cause the brake pressure to be reduced when the comparison by said third means indicates that the wheel speed is lower than said first threshold level;

said fifth means being adapted to cause the brake pressure to be reduced when the comparison by said third means indicates that the wheel speed is lower than said first threshold level, and when a condition that the wheel speed is lower than said second reference speed, lasts for a predetermined period of time.

2. An anti-skid control system according to claim 1, further comprising sixth and seventh means for a point of time when the reduction of the brake pressure is to be stopped;

said sixth means being adapted, when the point of time when the reduction of the brake pressure is to be started is set up by said fourth means, to cause the reduction of the brake pressure to be stopped when the wheel speed reaches a second predetermined threshold level;

said seventh means being adapted, when the point of time when the reduction of the brake pressure is to be started is set up by said fifth means, to cause the reduction of the brake pressure to be stopped when the wheel speed becomes higher than said first reference speed.

3. An anti-skid control system according to claim 1, wherein said first threshold level is a reference wheel speed lower than the wheel speed by a predetermined amount, the rate of decrease thereof with respect to time being limited to a predetermined range.

* * * * *